United States Patent
Schaefer et al.

(10) Patent No.: US 8,220,863 B2
(45) Date of Patent: *Jul. 17, 2012

(54) BODY FOR A MOTOR VEHICLE

(75) Inventors: Joachim Schaefer, Darmstadt (DE);
Uwe Schmitz, Nauheim (DE); Bernd Dreyer, Taunusstein (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/968,105

(22) Filed: Dec. 14, 2010

(65) Prior Publication Data
US 2011/0139533 A1   Jun. 16, 2011

(30) Foreign Application Priority Data

Dec. 14, 2009   (DE) .......................... 10 2009 058 288

(51) Int. Cl.
*B60R 21/34* (2011.01)
*B62D 25/10* (2006.01)

(52) U.S. Cl. ......... 296/187.04; 296/187.09; 296/193.11; 180/69.2

(58) Field of Classification Search ............. 296/187.04, 296/187.09, 193.11, 198, 193.09; 180/69.2, 180/69.21
See application file for complete search history.

(56) References Cited

U.S. PATENT DOCUMENTS

| 6,641,209 | B2 | | 11/2003 | Warwel et al. | |
| 7,597,384 | B2 | * | 10/2009 | Wallman et al. | 296/187.04 |
| 7,614,688 | B2 | * | 11/2009 | Noel | 296/198 |
| 7,631,928 | B2 | * | 12/2009 | Ackland et al. | 296/193.11 |
| 7,651,156 | B2 | * | 1/2010 | Park | 296/187.04 |
| 7,984,943 | B2 | * | 7/2011 | Iwano et al. | 296/193.11 |
| 8,016,347 | B2 | * | 9/2011 | Uchino | 296/193.11 |
| 2004/0251716 | A1 | * | 12/2004 | Choi et al. | 296/187.03 |
| 2006/0064845 | A1 | | 3/2006 | Fujii et al. | |
| 2008/0185871 | A1 | | 8/2008 | Ishiyama et al. | |
| 2011/0121608 | A1 | * | 5/2011 | Schmitz et al. | 296/187.09 |

FOREIGN PATENT DOCUMENTS

| DE | 19957869 A1 | 6/2001 |
| DE | 10126195 C1 | 11/2002 |
| DE | 10308371 A1 | 9/2004 |
| DE | 102004041269 A1 | 3/2006 |
| DE | 102006039163 A1 | 4/2007 |
| DE | 102006015403 A1 | 10/2007 |
| DE | 102006015409 A1 | 10/2007 |

(Continued)

OTHER PUBLICATIONS

German Patent Office, German Search Report for Application No. 102009058288.6, dated Aug. 30, 2010.

(Continued)

*Primary Examiner* — Jason S Morrow

(74) *Attorney, Agent, or Firm* — Ingrassia Fisher & Lorenz, P.C.

(57) ABSTRACT

A body for a motor vehicle includes, but is not limited to a supporting structure, a hood, which is hinged to the supporting structure and includes, but is not limited to a framework and an outer skin, and at least one compressible support disposed between the framework of the hood and the supporting structure. A contact surface opposite the support on the hood side is connected to the outer skin by a stiffening element extending through a cavity of the framework.

14 Claims, 2 Drawing Sheets

FOREIGN PATENT DOCUMENTS

| | | | |
|---|---|---|---|
| DE | 102008007703 A1 | 8/2008 |
| DE | 102007038086 A1 | 2/2009 |
| DE | 102009017786 B3 | 10/2010 |
| DE | 102009042062 A1 | 3/2011 |
| FR | 2852563 A1 * | 9/2004 |
| JP | 2001278118 A | 10/2001 |
| JP | 2001278124 A | 10/2001 |
| JP | 2005112140 A | 4/2005 |
| JP | 2007069643 A | 3/2007 |
| JP | 2007137366 A | 6/2007 |

OTHER PUBLICATIONS

UKIPO, British Search Report for Application No. 1020407.1, dated Mar. 16, 2011.

* cited by examiner

BODY FOR A MOTOR VEHICLE

CROSS-REFERENCE TO RELATED APPLICATION

This application claims priority to German Patent Application No. 102009058288.6, filed Dec. 14, 2009, which is incorporated herein by reference in its entirety.

TECHNICAL FIELD

The technical field relates to a body for a motor vehicle and in particular a configuration of this body in the vicinity of a hood, which offers effective protection from head injuries in the event of a collision with a pedestrian.

BACKGROUND

The so-called Head Impact Criterion HIC has been developed as a measure for the risk of injury to a pedestrian. HIC values are calculated as retardation values which are measured when a test body having masses corresponding to an adult head or a child head is shot against the hood at a predetermined speed. In order to be licensed for road traffic, the bodies of newly developed motor vehicles must remain below predetermined HIC limits, which require considerable expenditure on optimization. Conventionally the hood of a motor vehicle comprises an outer skin of sheet metal and a framework located there under, which stiffens the outer skin. The framework is only supported on a supporting structure of the body located there under, at certain points, in particular by means of hood hinges, hood lock, etc. The deformation resistance of the hood in the event of an impact is therefore variable from one place to another depending on how effectively the hood is stiffened by the framework located there under at the place of impact and how far removed the place of impact is from one of the support points of the framework. Each additional stiffening of the hood, which is introduced to increase its deformation resistance in a central region, can have the result that in a region stiffened directly by the framework or located closer to the support points, the stiffness of the hood is too high to satisfy the HIC requirements.

It has been shown that in order to observe the HIC criterion, the hood should initially have a high deformation resistance, which is severely reduced after the onset of deformation. This reduction has the result that after overcoming the initial resistance, the retardation of the impacting pedestrian head is considerably lower than that in the initial phase of the impact. However, the retardation must still be sufficiently strong to completely decelerate the head before a deformation region of the hood is completely used up and the hood impacts against nonresilient vehicle components located there under, in particular against an engine block. In order to still be able to intercept such smashing-through to nondeformable components at the highest possible collision speed, it is important that the available deformation region is utilized as fully as possible.

A body for a motor vehicle is known from the non-prior-published application DE 10 2009 042062.2, in which at least one compressible support is disposed between the framework of the hood and a supporting structure of the motor vehicle to increase the initial deformation resistance of a hood comprising a framework and an outer skin. Tests have shown that in the event of an impact on such a hood, initially the outer skin collapses, whereby a part of the deformation region of the hood is lost and the support is only so severely loaded that it is effectively compressed after collapse of the outer skin.

It is at least one object to further improve the protective effect of such a body. In addition, other objects, desirable features and characteristics will become apparent from the subsequent summary and detailed description, and the appended claims, taken in conjunction with the accompanying drawings and this background.

SUMMARY

A motor vehicle body is provided that comprises a supporting structure, a hood, which is hinged to the supporting structure and comprises a framework and an outer skin, and at least one compressible support disposed between the framework of the hood and the supporting structure, a contact surface opposite the support on the hood side is connected to the outer skin by means of a stiffening element extending through a cavity of the framework. By means of this stiffening element, it is already possible to severely load the support in an initial phase of the impact so that the outer skin need not collapse first. The available deformation region of the hood can thus be used in a substantially loss-free manner for retarding an impacting pedestrian.

In order to secure the hold of the support on the contact surface, the contact surface is preferably surrounded on at least two sides by downwardly extending walls between which the support engages. In order to make the hood flexurally rigid with low mass or in order to enable the substantially downwardly directed forces produced in the event of an impact to be efficiently transmitted along an edge of the hood, the outer skin and the framework thereof are preferably interconnected along a substantially vertical rib. The contact surface is preferably fastened to the rib to make use of its stiffness. The stiffening element is then preferably connected to an engine-side edge of the contact surface so that in the event of an impact, force from the hood can be transmitted to the contact surface on the one hand via the vertical rib and on the other hand via the stiffening element.

In order to promote buckling of the support under load, the rib can be designed to be more resilient than the stiffening element under a vertical force. The stiffening element and one of the downwardly extending walls can form a hollow rib which deforms under load and, by pressing against the support from the lateral direction, can facilitate collapse of the support. The stiffening element is preferably associated with a lug which abuts against the outer skin in order to introduce pressure acting on the outer skin into the stiffening element via the lug.

In order to make a dimensionally stable, loadable connection between the stiffening element and the lug, at least one bead can be distributed on the stiffening element and the lug and bridge a kink zone between the two. As a result of a first embodiment, the contact surface and the stiffening element can be formed in one piece with the framework. To this end, in particular, a tongue can be cut freely from the framework, from which the contact surface and the stiffening element are formed. Alternatively, the contact surface and the stiffening element can be inserted in a window of the framework.

The support can act on the supporting structure expediently above a front wheel, in particular on a longitudinal member spanning a wheel housing. The support can be formed simply and cheaply from flat material, in particular from sheet metal, in particular cut to size and bent. Other materials such as plastic also come into consideration. This makes it possible to manufacture the support as an extruded profile or as an injection molding.

In order to minimize the HIC value, it is desirable to achieve a strong retardation at the beginning of an impact, which diminishes substantially with the onset of deformation of the hood. This can be achieved in particular with a support that buckles under compression. In order that the support begins to yield reliably and reproducibly at a predetermined loading, in particular in the event of an impact in a central region of the hood not directly supported by the support disposed at an edge of the hood, the support is expediently designed such that in the compressed state of the support, a central section of the support is deflected continuously away from the center of the hood.

The support preferably comprises a plurality of plate-like elements extending in the longitudinal direction of the support. These plate-like elements can be stiffened in a mutually supportive manner if they are arranged at an angle with respect to one another and are connected along bending edges. The plate-like elements are preferably connected to one another in one piece. In the folded state, the connected plate-like elements can absorb twice as much energy since the bending edges are pressed flat.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
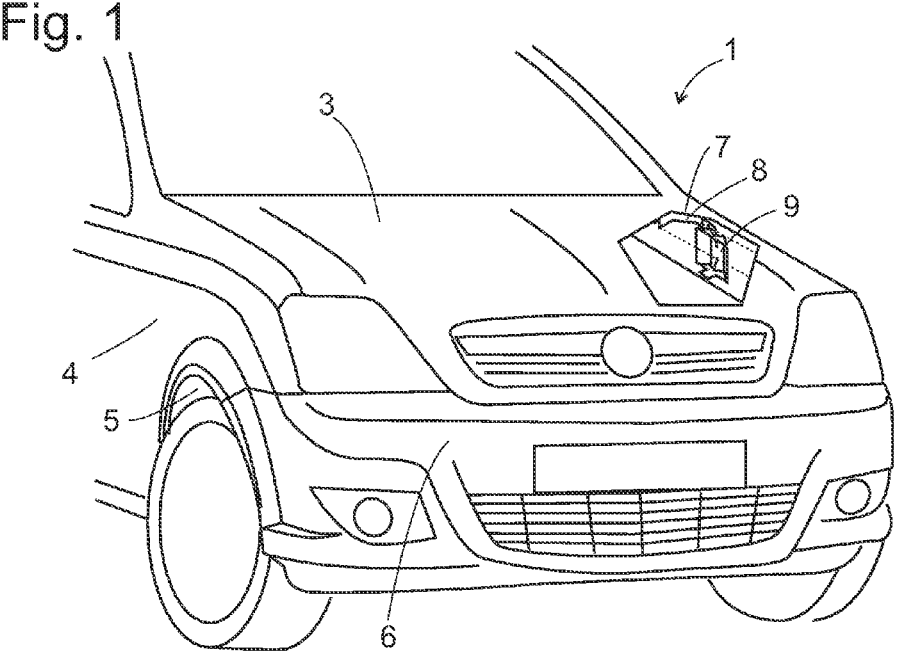
FIG. 1 shows a view of the front part of a motor vehicle body according to an embodiment.

FIG. 1 shows a perspective view of the front region of a motor vehicle body 1 according to an embodiment. A hood 3 is connected to a stiff supporting structure in a manner known per se by means of hinges, which fix a pivot axis adjacent to their rear edge. The supporting structure comprises in the usual manner body parts which are immovable with respect to one another when used as intended, such as longitudinal and transverse members forming an inner framework, wings 4, wheel housings 5, fenders 6, etc.

The hood 3 shown in partially cutaway view in FIG. 1 comprises in a manner likewise known per se an outer skin 7 made of sheet metal and a framework 8 concealed below the outer skin 7, which comprises struts running at least along the edge of the outer skin and struts crossing the hood 3, possibly not visible in the figure. The framework 8 is formed from sheet metal and cut to size in a manner known per se like the outer skin 7.

In FIG. 1, a window is cut into the hood 3, in which parts of the outer skin 7 and the framework 8 can be seen in section. A longitudinal strut of the framework running along the lateral edge of the hood 3 has a profile indicated by dotted line in the figure and is connected to the outer skin 7 at its outer edge and substantially parallel to the edge at a distance of a few centimeters from this. The width of the struts is significantly greater than their height.

One of two supports 9 is visible in the window of the hood 3, which supports are mounted on the two front wheel housings 5 in a mirror-image manner with respect to one another, concealed under the hood 3, and extend in a free-standing manner as far as directly under the strut of the framework 8 running over the wheel housing 5. An air gap can be provided between the upper end of the support 9 and the framework 8, which is sufficient so that vibrations of the hood 3 which occur during normal travel, do not result in hitting against the supports 9; it is also feasible to provide an elastically deformable damping layer between the upper end of the support 9 and the framework 8, which does not hinder closing of the hood 3 but when the hood 3 is closed, touches both the support 9 and also the framework 8 and thereby damps vibrations of the hood 3.

Figure 2:
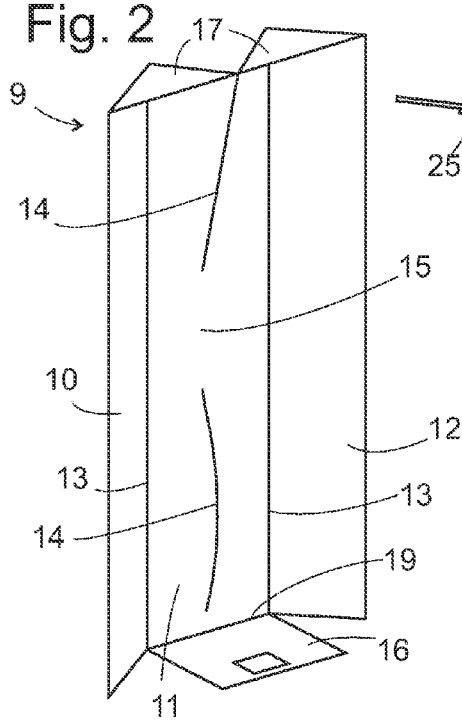
FIG. 2 shows a view of a hood support used in the motor vehicle body of FIG. 1.

FIG. 2 shows a perspective view of the support 9. The support 9 formed in one piece from a sheet metal blank can be substantially divided into three elements 10, 11, 12 extending over their total height, which are each associated with one another along vertical kink or bending edges 13. The two outer elements 10, 12 are aligned in the longitudinal direction of the support 9, i.e. substantially vertically and run substantially rectilinearly in the longitudinal section along a substantially vertical plane of intersection. A vertically oriented bead 14, which is interrupted at half the height of the support 9, is embossed into the central element 11. The depth of the bead 14 increases continuously upward and downward from the discontinuity 15, which gives the element 11 a curved form in longitudinal section. The part of the bead 14 extending under the discontinuity 15 reaches its maximum depth at approximately a quarter of the height of the support 9; from there downward, the depth of the bead 14 goes toward zero again so that at its lower edge the element 11 goes over into a horizontal lug 16 fastened on the wheel housing 5 via a straight kink line 19.

For the sake of simplicity, the lateral elements 10, 12 are shown exactly rectilinearly in FIG. 2; they can, however, also be slightly curved in longitudinal section by embossing the bead 14 in the central element 11, in particular along the bending edges 13.

The upper end of the support 9 is formed by two horizontal triangular end plates 17, which each have an edge connected to the central element 11 and an edge connected to one of the outer elements 10, 12. The end plates 17 can be formed in one operation with the elements 10, 11, 12 by deep drawing; it is also feasible to fabricate the support 9 from a sheet metal blank having four triangular lugs protruding along the upper edges of the elements 10, 11, 12 and to form the end plates 17, by bending respectively two of these lugs, folding them over one another, and joining them together for example, by spot welding.

The concave side of the support 9 facing the observer in FIG. 2 is facing the engine compartment in the mounted state, as can be identified in FIG. 1. When the support 9 is compressed in the event of an impact, the central region of the element 11 at the height of the discontinuity 15 is deflected from the engine compartment toward the adjacent wing 4. A free space is left free between the support 9 and the wing 4, whose width corresponds to at least half the height of the support 9 so that when this buckles at the height of the discontinuity 15, the sides of the support 9 formed above and below the discontinuity 15 can lay substantially flat between the hood 3 and the wheel housing 5. Thus, in the event of an impact, the hood 3 can yield over almost the entire height of the support 9.

The placement of the support 9 underneath the framework 8 is necessary in order to use the stiffness of the framework 8 and be able to introduce the force of an impact, which can take place remotely from the support 9 on the outer skin 7, into the support. In order to ensure that the framework 8 does not collapse first but that the force is introduced into the support 9 immediately with the onset of the impact and causes this to buckle, as a result of a first embodiment of the invention, the framework 8 has the cross-section shown in FIG. 3 at the height of a contact surface 20 located opposite the support 9. The plane of intersection of FIG. 3 extends substantially vertically in the transverse direction of the vehicle. The outer skin 7 of the hood 3 is bent around downward at its lateral edge to form an inwardly open U-profile section 18 and a substantially vertical edge strip 21. The longitudinal strut of the framework 8 comprises an approximately horizontal base plate 22, at the outer edge whereof a downwardly bent strip-shaped flange 23 is firmly connected to the edge strip 21. A substantially vertical wall 24 adjoins the inner edge of the base plate 22 facing the engine, which wall supports the outer skin 7 by means of a substantially horizontal strip-shaped flange 25.

At the height of the support 9, a lug is cut freely from the base plate 22 and notched, its width in the longitudinal direction of the vehicle being slightly greater than that of the support 9. The resulting opening in the base plate 22 is designated by 26. The lug associated with the outer flange 23 is bent in order to form the horizontal contact surface 20 in its region adjacent to the edge of the hood 3, a downwardly directed rib 27 adjoining this toward the engine, and an oblique wall 28 in turn adjoining this, which supports the outer skin 7 by means of a flange 29 acting between the flange 25 and the edge of the outer skin 7. Whereas in the event of an impact, the wall 24 of the framework 8 can yield relatively easily, by bending the base plate 22 downward, and also the U-profile section 19 of the outer skin 7 is very easily flexible, the wall 28 transmits the impact force from the beginning of the impact substantially undamped to the support 9 and specifically in particular to its side facing the engine. As can be seen in FIG. 2, this is hollow and more readily resilient than the outer side having the bending edges 13. The structure of the lug thus has the result that the support 9 reliably buckles outward under overloading.

Figure 3:
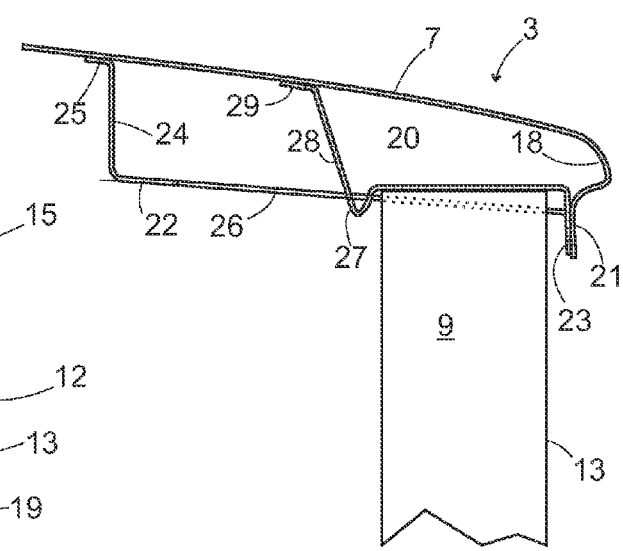
FIG. 3 shows a schematic section through a lateral edge region of the hood of the vehicle from FIG. 1.
Figure 4:
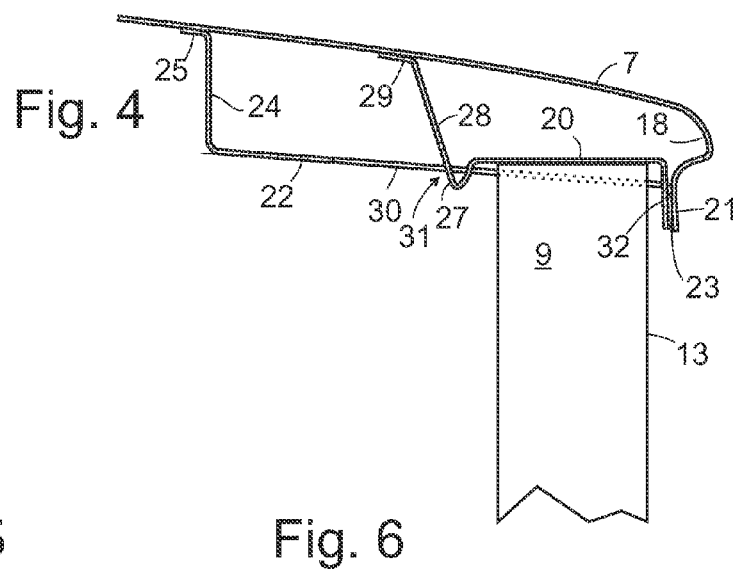
FIG. 4 shows a section similar to FIG. 3 according to a second embodiment.

The configuration of FIG. 3 is very economical from the production technology and material expenditure point of view since the contact surface 20 and the wall 28 can be formed from the framework 8 itself without using additional material. A disadvantage of this approach, however, is that the stiffness of the wall 28 cannot be increased independently of that of the framework 8. Stiffening in the region of the wall 28 and the contact surface 20 is only possible if the entire framework 8 is formed with a higher wall thickness. However, this is not desirable from the point of view of material costs and also from the viewpoint of the vehicle weight and the associated fuel consumption. As a result of a further development shown in FIG. 4, an opening 30 is therefore cut into the base plate 22 at the height of the support 9, said opening extending directly to the foot of the outer flange 23. A bridge part 31 formed from flat material having a greater wall thickness than the framework 8 is inserted in the opening 30. This bridge part 31 in turn comprises a horizontal contact surface 20 lying opposite the support 9, a downwardly directed rib 27, and an adjoining wall 28, which ascends obliquely upward and supports the outer skin 7 by means of a flange 29. An outer flange 32 of the bridge part 31 is firmly connected to the flange 23 and the edge strip 21 of the outer skin 7.

Figures 5, 6:
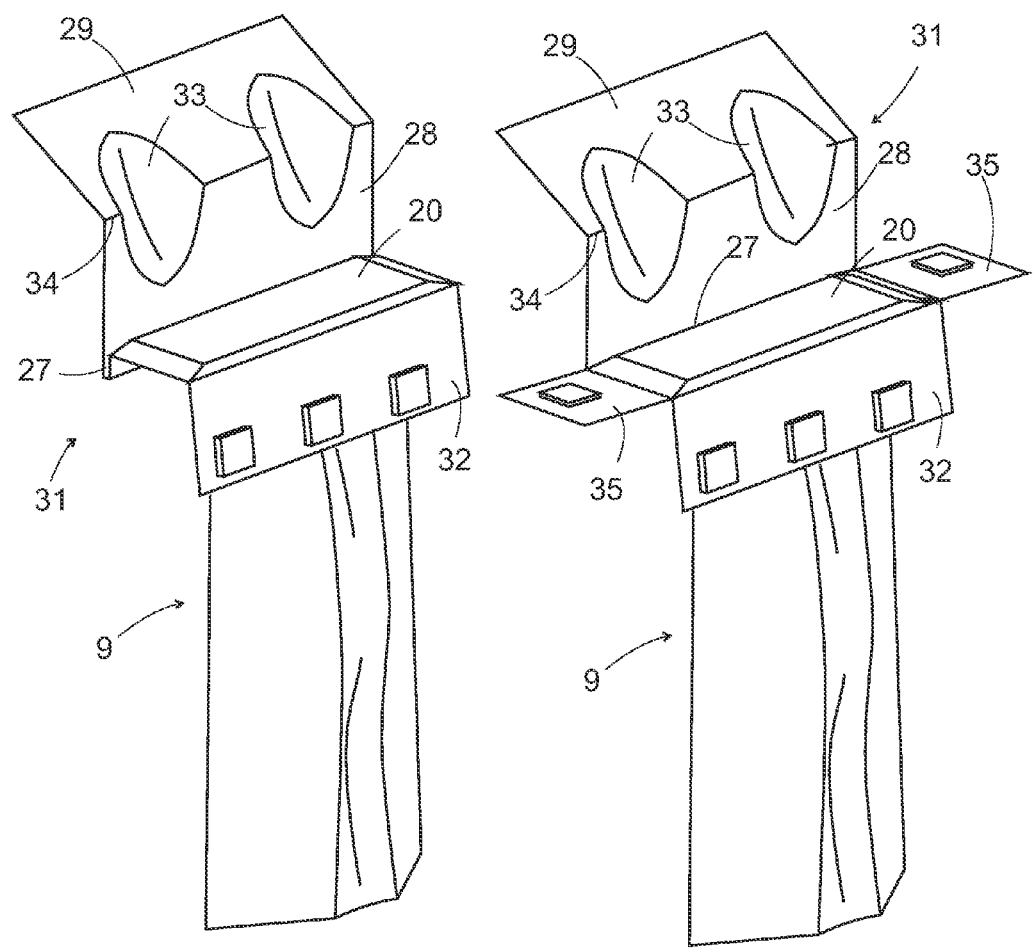
FIG. 5 shows a perspective view of the support and a contact surface opposite the support on the hood side.
FIG. 6 shows a view similar to FIG. 5 according to another embodiment.

FIG. 5 shows the bridge part 31 and the support 9 according to a first embodiment in a schematic perspective view. The contact surface 20 is slightly concave on its underside to provide a secure hold for the support 9. A plurality of large-size beads 33, in this case two items, cross a kink line 34 between the wall 28 and the flange 29 and thus make this region of the bridge part 31 extremely rigid. This rigidity ensures that in the event of an impact on the edge of the contact surface 20 facing the engine, adjacent to the rib 27, a higher pressure acts on the support 9 than on the outer edge of the contact surface 20, adjacent to the flange 32. The bridge part 31 can therefore only yield to the force of an impact to a very limited extent and specifically initially by the rib 27 bending outward toward the support 9. This lateral pressure on the support 9 in the same way as the nonuniform distribution of the load between inner and outer edge of the contact surface 20 favors the outward buckling of the support 9.

The bridge part in FIG. 6 substantially only differs from that of FIG. 5 by two lugs 35 extending from the contact surface 20 forward or backward in the direction of travel. These lugs 35 are provided for fastening on the base plate 22 in front of or behind the opening 30. They are also used for the stiffening of the bridge part 31 and for the immediate and undamped transmission of the impact force to the support 9. When the support 9 is loaded, the elements 10, 11, 12 at the height of the discontinuity 15 are aligned along a straight line, along which they then buckle. On the other hand, at most small forces driving the elements 10, 11, 12 apart along the bending edges 13 act in the upper and lower region of the supports 9. The strength of the support 9 and the hood 3 is designed so that in the event of an impact of an NCAP test body corresponding to a child's head, the support 9 buckles at the height of the discontinuity 15, but the elements 10, 11, 12 at the upper and lower end of the support 9 substantially retain their original orientation with respect to one another. On the other hand, the impact of an NCAP test body corresponding to an adult head releases so much energy that not only does the support buckle but in addition, the elements 10, 12 above and below the kink zone are pressed so firmly against one another that the elements 10, 12 are splayed apart at least in the lower region of the support and lay flat on the wheel housing 5. Changes in the masses prescribed for the test bodies or the prescribed impact speed, which can occur in the course of updating the NCAP test conditions, such as changing from 2.5 kg to 3.5 kg for the child's head test body and from 4.8 kg to 4.5 kg for the adult head test body can be taken into account when designing the support. The two-phase compression of the support makes it possible to design the support 9 so that the hood 3 is on the one hand sufficiently "soft" to satisfy the HIC criterion for the light test body but that on the other hand, it can absorb sufficient energy to prevent the heavy test body crashing through onto the engine block, regardless of which the precise masses of the test bodies or their impact speeds are.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A body for a motor vehicle, comprising:
a supporting structure;
a hood hinged to the supporting structure and comprising a framework and an outer skin;
at least one compressible support disposed between the framework of the hood and the supporting structure; and
a contact surface opposite the at least one compressible support on the hood connected to the outer skin with a stiffening element extending through a cavity of the framework,
wherein the contact surface is surrounded on at least two sides by downwardly extending walls between which the at least one compressible support engages.

2. The body according to claim 1, wherein the outer skin and the framework are interconnected along a substantially vertical rib and the contact surface is connected to the substantially vertical rib.

3. The body according to claim 2, wherein the stiffening element is connected to an engine-side edge of the contact surface.

4. The body according to claim 1, wherein the stiffening element and one of the downwardly extending walls are adapted to form a hollow rib.

5. The body according to claim 1, wherein the stiffening element is associated with a lug that abuts against the outer skin.

6. The body according to claim 5, wherein at least one bead bridges a kink zone between the stiffening element and the lug.

7. A body for a motor vehicle, comprising:
a supporting structure;
a hood hinged to the supporting structure and comprising a framework and an outer skin;
at least one compressible support disposed between the framework of the hood and the supporting structure; and
a contact surface opposite the at least one compressible support on the hood connected to the outer skin with a stiffening element extending through a cavity of the framework,
wherein the contact surface and the stiffening element are formed in one piece with the framework.

8. The body according to claim 7, wherein the contact surface and the stiffening element are formed from a tongue cut freely from the framework.

9. A body for a motor vehicle, comprising:
a supporting structure;
a hood hinged to the supporting structure and comprising a framework and an outer skin;
at least one compressible support disposed between the framework of the hood and the supporting structure; and
a contact surface opposite the at least one compressible support on the hood connected to the outer skin with a stiffening element extending through a cavity of the framework, wherein the contact surface and the stiffening element are inserted in a window of the framework.

10. The body according to claim 1, wherein the at least one compressible support is adapted to act on the supporting structure above a front wheel.

11. The body according to claim 1, wherein the at least one compressible support is formed from a flat material.

12. The body according to claim 1, wherein in a compressed state of the at least one compressible support, a central section of the at least one compressible support disposed on an edge of the hood is deflected continuously away from a center of the hood.

13. The body according to claim 1, wherein the at least one compressible support comprises a plurality of plate-shaped elements disposed at an angle with respect to one another in a cross-section.

14. The body according to claim 13, wherein the plurality of plate-shaped elements are connected in one piece along bending edges.

* * * * *